US011481379B2

(12) United States Patent
Williams et al.

(10) Patent No.: US 11,481,379 B2
(45) Date of Patent: Oct. 25, 2022

(54) METADATA VARIANCE ANALYTICS

(71) Applicant: HEWLETT-PACKARD DEVELOPMENT COMPANY, L.P., Houston, TX (US)

(72) Inventors: Kevin Williams, San Diego, CA (US); Amit Kumar Singh, Houston, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 160 days.

(21) Appl. No.: 16/177,843

(22) Filed: Nov. 1, 2018

(65) Prior Publication Data

US 2020/0142983 A1    May 7, 2020

(51) Int. Cl.

| | |
|---|---|
| *G06F 16/23* | (2019.01) |
| *G06F 16/21* | (2019.01) |
| *G06F 16/22* | (2019.01) |
| *G06F 16/2455* | (2019.01) |
| *G06F 16/25* | (2019.01) |
| *G06F 16/27* | (2019.01) |

(52) U.S. Cl.
CPC ........ *G06F 16/2365* (2019.01); *G06F 16/214* (2019.01); *G06F 16/2282* (2019.01); *G06F 16/2456* (2019.01); *G06F 16/254* (2019.01); *G06F 16/27* (2019.01); *G06F 16/273* (2019.01); *G06F 16/275* (2019.01); *G06F 16/278* (2019.01)

(58) Field of Classification Search
None
See application file for complete search history.

(56) References Cited

U.S. PATENT DOCUMENTS

| 6,816,848 B1 | 11/2004 | Hildreth et al. |
|---|---|---|
| 7,707,163 B2 | 4/2010 | Anzalone et al. |
| 9,348,874 B2 | 5/2016 | Schroetel et al. |
| | (Continued) | |

FOREIGN PATENT DOCUMENTS

WO    WO-2016153790 A1    9/2016

OTHER PUBLICATIONS

A Unified Approach to Data Processing and Analytics, 2017, Oracle.
(Continued)

*Primary Examiner* — Neveen Abel Jalil
*Assistant Examiner* — John J Morris
(74) *Attorney, Agent, or Firm* — Perry + Currier Inc.

(57) ABSTRACT

An example of an apparatus including a network interface to receive first metadata and second metadata. The first metadata is associated with a first data source and the second metadata is associated with a second data source. The apparatus includes a processor to determine a first series of variance values associated with first metadata and second metadata, and to determine a second series of variance values associated with first metadata and second metadata. Furthermore, the apparatus includes a memory storage unit to store the first series of variance values and the second series of variance values. The apparatus includes an analysis engine to analyze the first series of variance values and the second series of variance values to confirm compatibility between the first data source and the second data source. The second series of variance values is to be analyzed after the first series of variance values is passed.

6 Claims, 6 Drawing Sheets

(56) References Cited

U.S. PATENT DOCUMENTS

| | | | | |
|---|---|---|---|---|
| 2013/0262651 A1* | 10/2013 | Shah | ................... | G06F 8/658 |
| | | | | 709/224 |
| 2014/0214382 A1* | 7/2014 | Haas | ................... | G06F 30/20 |
| | | | | 703/6 |
| 2016/0124989 A1* | 5/2016 | Kumar | ............... | G06F 16/258 |
| | | | | 707/690 |
| 2016/0275150 A1* | 9/2016 | Bournonnais | ..... | G06F 16/24575 |
| 2018/0004509 A1* | 1/2018 | Narasimhan | ........ | G06F 16/1873 |
| 2018/0096001 A1* | 4/2018 | Soza | ................. | G06F 16/235 |
| 2018/0101581 A1* | 4/2018 | Toumura | ............ | G06F 16/2448 |

OTHER PUBLICATIONS

Hwang J. et al., Automation and orchestration framework for large-scale enterprise cloud migration, Mar. 28, 2016, IBM.
Orchestrating automation, HCL Technologies.
Ranjan Rajiv et al., Orchestrating BigData Analysis Workflows, 2017, IEEE Computer Society.

* cited by examiner

| Test Series | Subseries | Datasource | Schema name | Table name | Column Name | Column Value | Outcome |
|---|---|---|---|---|---|---|---|
| A1 | atables | prod | aschema | tablename | tablename | table_count | 39 |
| A1 | ttables | prod | tschema | tablename | tablename | table_count | 33 |
| A1 | ztables | prod | tschema | tablename | tablename | table_count | 118 |
| A1 | atables | stab | aschema | tablename | tablename | table_count | 49 |
| A1 | ttables | stab | tschema | tablename | tablename | table_count | 38 |
| A1 | ztables | stab | tschema | tablename | tablename | table_count | 139 |

Fig. 5a

| Test Series | Subseries | Datasource | Schema name | Table name | Column Name | Column Value | Outcome |
|---|---|---|---|---|---|---|---|
| A2 | atables | prod | aschema | ahealthstatus | ahealthstatus | column_count | 30 |
| A2 | atables | prod | aschema | appsinstalled | appsinstalled | column_count | 23 |
| A2 | atables | prod | aschema | battery | battery | column_count | 48 |
| A2 | atables | prod | aschema | biostype | biostype | column_count | 23 |
| A2 | atables | stab | aschema | ahealthstatus | ahealthstatus | column_count | 30 |
| A2 | atables | stab | aschema | appsinstalled | appsinstalled | column_count | 23 |
| A2 | atables | stab | aschema | battery | battery | column_count | 48 |
| A2 | atables | stab | aschema | biostype | biostype | column_count | 23 |

Fig. 5b

| Test Series | Subseries | Datasource | Schema name | Table name | Column Name | Column Value | Outcome |
|---|---|---|---|---|---|---|---|
| A1 | atables | prod_stab | aschema | tablename | tablename | table_count | 39 \| 49 \| 25.641% |
| A1 | itables | prod_stab | tschema | tablename | tablename | table_count | 33 \| 38 \| 15.152% |
| A1 | ztables | prod_stab | tschema | tablename | tablename | table_count | 118 \| 139 \| 17.797% |

Fig. 6A

| Test Series | Subseries | Datasource | Schema name | Table name | Column Name | Column Value | Outcome |
|---|---|---|---|---|---|---|---|
| A2 | atables | prod_stab | aschema | ahealthstatus | ahealthstatus | column_count | 30 \| 30 \| 0 % |
| A2 | atables | prod_stab | aschema | appsinstalled | appsinstalled | column_count | 23 \| 23 \| 0 % |
| A2 | atables | prod_stab | aschema | battery | battery | column_count | 47 \| 48 \| 2.04 % |
| A2 | atables | prod_stab | aschema | biostype | biostype | column_count | 23 \| 23 \| 0 % |

Fig. 6B

METADATA VARIANCE ANALYTICS

BACKGROUND

Data may be stored in computer-readable databases. These databases may store large volumes of data collected over time. Processing large databases may be inefficient and expensive. Computers may be used to retrieve and process the data stored in databases.

BRIEF DESCRIPTION OF THE DRAWINGS

Reference will now be made, by way of example only, to the accompanying drawings in which.

DETAILED DESCRIPTION

Increasing volumes of data create increased complexity when storing, manipulating, and assessing the data. For example, with increases in the connectively of devices and the number of sensors in the various components of each device making time-series measurements, the generated data is increasingly voluminous and complex.

Complexity in retrieving, combining, migrating, and manipulating multiple datasets may arise from the complex data structures of systems, system components, and component attributes and their corresponding values. In addition, such complexity may arise from the large volumes of data generated by lengthy time-series measurements related to ensembles of numerous systems. Accordingly, multiple databases of lookup datasets (each dataset corresponding to a separate system) may be joined and presented at a single location instead of spread across multiple data sources. It is to be appreciated that combining large datasets may present issues if the metadata from the datasets are not identical, such if the datasets are received from multiple data sources having different designs.

As an example, an organization may migrate data from one dataset to another or combine multiple datasets during a hardware upgrade or modernization of its infrastructure. It is to be appreciated that each dataset may vary due to differences in design and implementation. Accordingly, once the data in each dataset is migrated or moved, the data may be tested to ensure the data in the new database is correct to reduce potential errors being introduced during the process. The data may be tested using testing code or by sampling data from the datasets; however, this may not be practical as the datasets become larger and/or more complex.

As described herein, a database may store metadata from multiple dataset sources along with variance values to facilitate testing of multiple datasets. The metadata from the different sources may be stored in a single structure with a substructure to store variance values. This provides the capability to automatically generate variance reports using automated processes, referred to as database orchestration. Therefore, large and complex databases may be migrated and tested in an efficient manner. In particular, the variance values stored provide a quick and efficient method to quantify how different metadata (i.e. a dataset structure) is from one data source to another. This may allow an administrator to validate the data sources and to identify potential design issues that to be addressed based on a quantified difference between multiple data sources.

Figure 1:
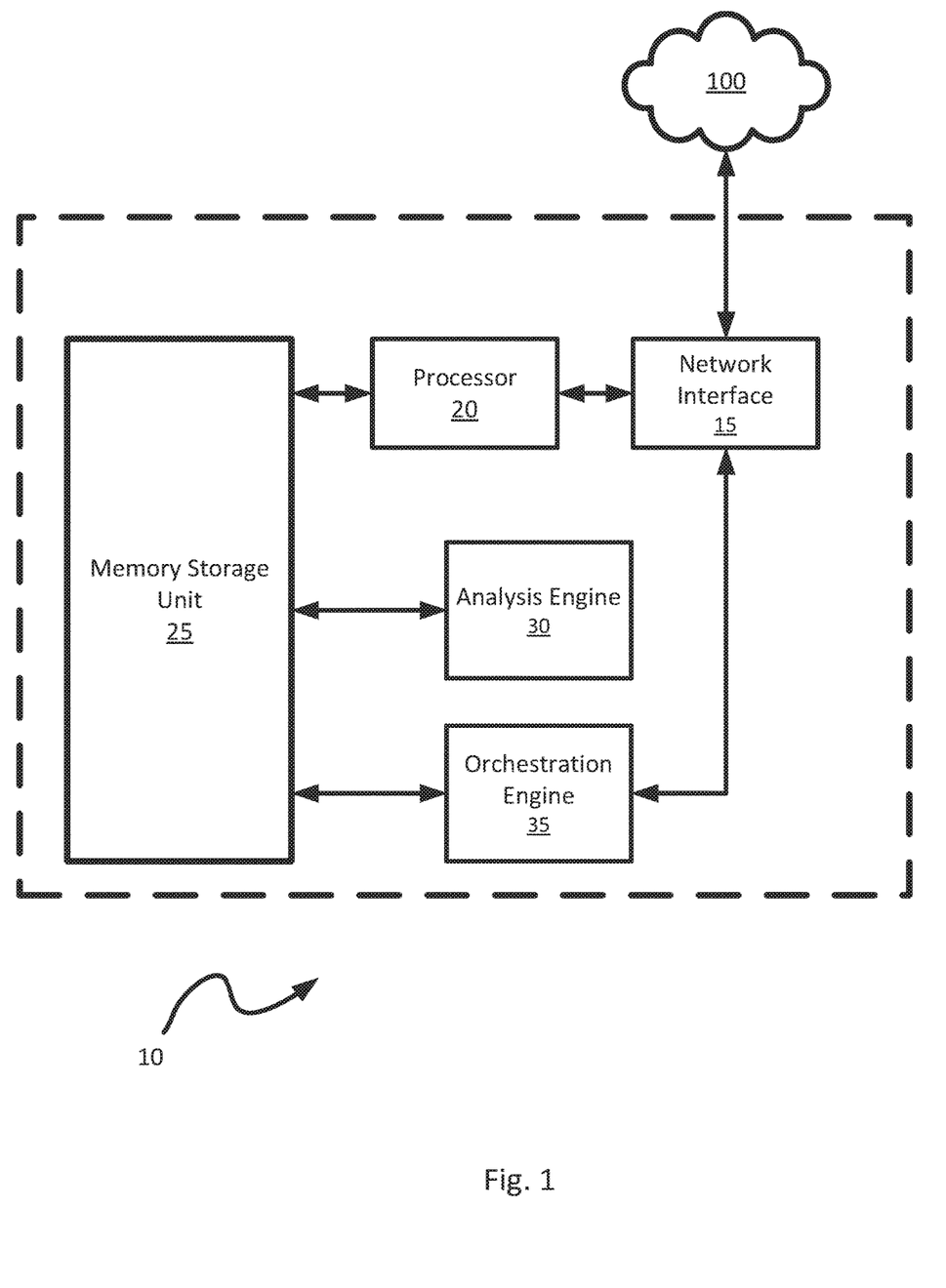
FIG. 1 is a block diagram of an example apparatus to use metadata variance analytics to compare databases and orchestrate data from multiple data sources.

Referring to FIG. 1, an apparatus to use metadata variance analytics to compare databases and orchestrate data from multiple data sources is generally shown at 10. The apparatus may include additional components, such as various memory storage units, interfaces to communicate with other computer apparatus or devices, and further input and output devices to interact with a user or another device. In the present example, the apparatus 10 includes a network interface 15, a processor 20, a memory storage unit 25, an analysis engine 30, and an orchestration engine 35. Although the present example shows the processor 20 and the analysis engine 30 as separate components, in other examples, the analysis engine 30 and/or the orchestration engine 35 may be combined with the processor 20 and may be part of the same physical component such as a microprocessor configured to carry out multiple functions.

The network interface 15 is to receive various metadata from multiple data sources via a network 100. The network 100 may provide a link to a data source, such as a server managing a database to which metadata may be associated. In addition, the network 100 may provide a link to another data source, such as a second server managing a database to which additional metadata may be associated. The network interface is not particularly limited. For example, the network interface 15 may be a wireless network card to communicate with the network 100 via a WiFi connection. In other examples, the network interface 15 may also be a network interface controller connected to via a wired connection such as Ethernet.

In the present example, the network interface 15 receives metadata instead of the complete dataset. By receiving the metadata, it is to be appreciated that various validation procedures may be carried out. In some examples, the network interface 15 may receive datasets from the data sources as well, such as in examples where the apparatus 10 may also perform functions such as merging the datasets. In these examples, the datasets received at the network interface 15 are not particularly limited and may be for applications configured to handle a large amount of data such as to manage a device as a service system. For example, the datasets may be to support an application to operate a device logging system or a device registration system configured to track and record information about multiple devices. Accordingly, each dataset includes metadata associated with the dataset to provide information about how the data in the dataset is to be stored. Other examples where the datasets may be used include complex systems with multiple components where data may be collected from the components. For example, other systems may include an automobile parts logging system, a system to store data about a human body or other biological system as represented in an electronic medical record (EMR), or DNA/RNA if encoded proteins or DNA/RNA segments which contain specific genes which may be considered components.

It is to be appreciated that datasets may be continuously monitored and changed. Accordingly, the metadata associated with various data sources may evolve over time and drift apart. By changing the metadata, subsequent validation of data from multiple data sources may become challenging. For example, in the event that data may be migrated from one data source to another data source, or multiple datasets from multiple data sources may be combined into a single data source using the orchestration engine 35. Continuing with the above example of a plurality of datasets for a data application managing a plurality of devices, data in a dataset may be migrated to another dataset in a different database when a physical device ends a subscription with a client and begins a new subscription at another client which is managed by a different server from the original client. In this example, the data stored in the database may include information about the devices being managed in the dataset, such as a device identifier, manufacturing information, or service dates. In other examples, the information may include a model name, device name, warranty information, service information, support information, or system crash information in the device as a service system.

The processor 20 is to determine multiple series of variance values associated with the metadata from each of the multiple data sources received via the network interface 15. For example, the metadata from two different data sources may provide various fields which may be compared to obtain a variance value. The grouping of variance values into a series is not particularly limited. For example, a series may be associated with a count of the number of tables in the metadata from each of the sources. Another series may be associated with a count of the number of columns within each table. In other examples, the metadata comparison between multiple data sources may provide a binary result (i.e. match or no match), such as when names of schemas, tables or view, columnar data types, columnar nullable field strings and columnar sequence are compared. In the present example, each variance value in the series of variance values is determined by the processor 20 as the percentage variance of selected numerical values in the metadata received. In other words, each variance value is a proportional change of a value. Accordingly, it is to be appreciated that the variance value may be used to indicate the extent to which the datasets received from the multiple data sources differ.

The manner by which the processor 20 calculates the variance value is not particularly limited. In the present example, the variance value may be calculated by joining the metadata received from multiple data sources. For example, if a metadata field from different data sources store a count of columns in a dataset, the metadata field from each source may be used as the basis for calculating a percentage variance value using a formula. It is to be appreciated that the metadata field from the different sources is not particularly limited and may include numerical values that represent other features of the separate datasets.

The processor 20 may include a central processing unit (CPU), a microcontroller, a microprocessor, a processing core, a field-programmable gate array (FPGA), an application-specific integrated circuit (ASIC), or similar. In the present example, the processor 20 may cooperate with a memory storage unit 25 to execute various instructions. For example, the processor 20 may maintain and operate various applications with which a user may interact. In other examples, the processor 20 may send or receive data, such as input and output associated with administering metadata from multiple data sources.

The memory storage unit 25 is configured to store metadata from received via the network interface 15 as well as the series of variance values determined by the processor 20. The manner by which the memory storage unit 25 stores the metadata and the variance value is not particularly limited. For example, the memory storage unit 25 may maintain a table in a database to store the metadata received from multiple data sources as well as the variance value associated with the metadata that was determined using the processor 20. For example, the table maintained in the memory storage unit 25 may include a separate substructure to store the variance values.

In the present example, the memory storage unit 25 may include a non-transitory machine-readable storage medium that may be, for example, an electronic, magnetic, optical, or other physical storage device. In addition, the memory storage unit 25 may store an operating system that is executable by the processor 20 to provide general functionality to the apparatus 10. For example, the operating system may provide functionality to additional applications. Examples of operating systems include Windows™, macOS™, iOS™, Android™, Linux™, and Unix™. The memory storage unit 25 may additionally store instructions to operate at the driver level as well as other hardware drivers to communicate with other components and peripheral devices of the apparatus 10.

The analysis engine 30 is to analyze a series of variance values to confirm compatibility and/or consistency between the metadata from one data source with the metadata from another data source. In the present example, once compatibility is confirmed, the series of variance values may be considered to have passed the analysis. Once the series of variance values has passed the analysis, the analysis engine 30 may analyze another series of variance values to confirm compatibility between the metadata from one data source with the metadata from another data source.

The manner by which compatibility is confirmed is not particularly limited. In the present example, the analysis engine 30 may carry our different tests for a different series of the metadata. For example, in a series of variance values associated with a table count for each type of table in the metadata, the analysis engine 30 may be determining whether each variance value in the series is below a predetermined threshold. In particular, the analysis engine 30 may analyze the series of variance values to ensure each variance value is below five percent. In other examples, the analysis engine 30 may analyze the series of variance values to ensure each variance value is below ten percent. In yet another example, the analysis engine 30 may analyze the series of variance values to ensure each variance value is below twenty-five percent. In some examples, the analysis engine may use multiple thresholds for each variance value in the series of variance values.

Accordingly, it is to be appreciated that by analyzing the variance values of joined metadata, the analysis engine 30 may identify a difference between the metadata from different data sources. The differences may indicate a difference in the manner by which the data in each data source are arranged. For example, the analysis engine 30 may identify that one data source may have more tables than another, or the one data source may use tables having larger columns than another. Furthermore, by using variance values, the difference may also be quantified to determine how different the data sources are and whether such a difference may be acceptable when validating the data sources.

Continuing with this example, a second series of variance values may be associated with a column count for each table in the metadata from the multiple data sources. The analysis engine 30 may be determining whether each variance value in the second series is below a predetermined threshold before proceeding to another series of variance values.

Although the present example shows the ensure the analysis engine 30 and the processor 20 as separate components, in other examples, the ensure the analysis engine 30 and the processor 20 may be part of the same physical component such as a microprocessor configured to carry out multiple functions. In other examples, the analysis engine 30 and the processor 20 may be on separate servers of a server system connected by a network.

The orchestration engine 35 is to use the results from the analysis engine 30 stored in the memory storage unit 25 to combine datasets from multiple data sources to generate a combined dataset upon confirmation of compatibility by the analysis engine 30. In the present example, the memory storage unit 25 may also store datasets from multiple data sources to allow for fast access of the metadata and datasets by the orchestration engine 35 to improve coordination, such as during a migration or consolidation of datasets from different data sources found to be compatible by the analysis engine 30.

Figure 2:
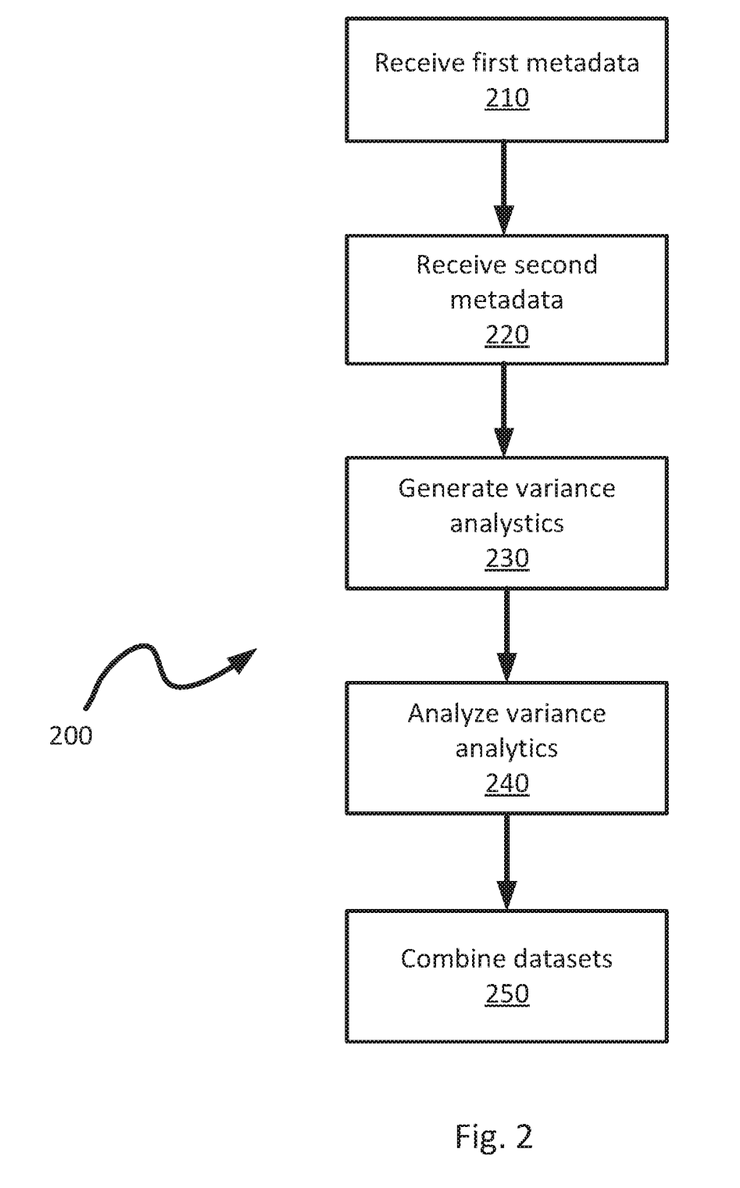
FIG. 2 is a flowchart of an example of a method of using metadata variance analytics to compare databases and orchestrate data from multiple data sources.

Referring to FIG. 2, a flowchart of an example method of using metadata variance analytics to compare databases and orchestrate data from multiple data sources is generally shown at 200. In order to assist in the explanation of method 200, it will be assumed that method 200 may be performed with the apparatus 10. Indeed, the method 200 may be one way in which apparatus 10 may be configured. Furthermore, the following discussion of method 200 may lead to a further understanding of the apparatus 10 and its various components. In addition, it is to be emphasized, that method 200 may not be performed in the exact sequence as shown, and various blocks may be performed in parallel rather than in sequence, or in a different sequence altogether.

Beginning at block 210, the memory storage unit 25 receives metadata associated with a dataset from a source, such as a database maintained on a remote server, over the network 100 via the network interface 15. The content of the metadata is not limited. In an example, the metadata may represent a dataset used to manage a plurality of devices. Furthermore, the manner by which the metadata is received is not particularly limited. In the present example, the metadata may be received as part of an automated process that is carried out periodically. In other examples, the metadata may be retrieved upon receiving a manual command from a user or administrator. In further examples, the metadata may be collected automatically from other databases, such as databases having an Internet of Things schema, where the devices populate the dataset with various data collected by sensors. In particular, automobiles, both self-driving and not, kitchen appliances, and implanted biological devices such as pacemakers and other RFID-tagged devices may use an Internet of Things schema.

Block 220 involves the memory storage unit 25 receiving additional metadata associated with a dataset from a different source from than the source associated with the metadata received at block 210 over the network 100 via the network interface 15. Similar to the metadata received at block 210, the content of the metadata received from the additional source is not limited. In addition, the manner by which the metadata is received is not particularly limited. In the present example, the metadata may be received as part of an automated process that is carried out periodically. In other examples, the metadata may be retrieved upon receiving a manual command from a user or administrator.

It is to be appreciated that block 210 and block 220 operate to collect multiple datasets from multiple data sources. In some examples, more than two datasets may be collected for storage in the memory storage unit 25. Furthermore, it is to be appreciated that block 210 and block 220 may be carried out in parallel or that the order by which the metadata is received may be reversed.

In block 230, variance analytics is generated based on the metadata received at block 210 and block 220. The manner by which the variance analytics is generated is not limited. In the present example, metadata received from block 210 is joined with the metadata received at block 220 by the processor 20 to provide combined metadata. The manner by which the metadata is joined is not particularly limited. For example, the process may involve performing queries on each database to obtain the metadata for generating the variance analytics that may be stored in a single table in the memory storage unit 25.

Next, the variance value for different combinations from the table of joined metadata is determined by calculating the percentage variance of selected numerical values in the metadata. Continuing with the example above, a query may be carried out on the separate metadata tables from block 230 and the percentage variance may be calculated. In particular, the calculation involves determining a difference between the two numerical values and dividing it by the first value of the metadata in the first table:

$$\text{Percentage Variance Value} = \frac{(Value_1 - Value_2)}{Value_1} \times 100\%$$

It is to be appreciated that in the percentage variance value may be positive or negative depending on whether the numerical value in the second table increases or decreases. A positive percentage variance value indicates that the numerical value has increase. In the present example, this may mean that the number of columns in the second dataset is greater than the number of columns in the first dataset. A negative percentage variance value indicates that the numerical value has decreased. In the present example, this may mean that the number of columns in the second dataset is lower than the number of columns in the first dataset. In either situation, the variance value may be used to identify differences as well as characterize differences between two datasets using the metadata of each dataset.

In the present example, this calculation may be carried out for various combinations to form a series of variance values. As an example, the number of tables belonging to a type of table in each metadata may be combined to calculate a series of variance values. As another example, column counts from each table from each metadata may be combined to calculate another series of variance values. In other examples, variance values may be binary to indicate whether there is a match or not. In such cases, a variance value of one or zero may be assigned to the series. For example, such series may include a binary result for names of schemas, tables or view, columnar data types, columnar nullable field strings, and columnar sequence.

Block 240 comprises using the analysis engine 30 to analyze the variance analytics to confirm whether different data sources are compatible. The manner by which the analysis engine 30 determines whether data sources are compatible is not limited. For example, the analysis engine 30 may be determining whether each variance value of the variance analytics generated at block 230 is below a predetermined threshold. In particular, the analysis engine 30 may analyze the series of variance values to ensure that no variance value is above five percent. In other examples, the analysis engine 30 may analyze the variance analytics to ensure that no variance value is above ten percent. In yet another example, the analysis engine 30 may analyze the variance analytics to ensure that no variance value is above twenty-five percent. In some examples, the analysis engine may use multiple thresholds for each variance value in the variance analytics generated at block 230. Upon confirmation from block 240, block 250 combines multiple datasets from multiple data sources to generate a combined dataset.

Figure 3:
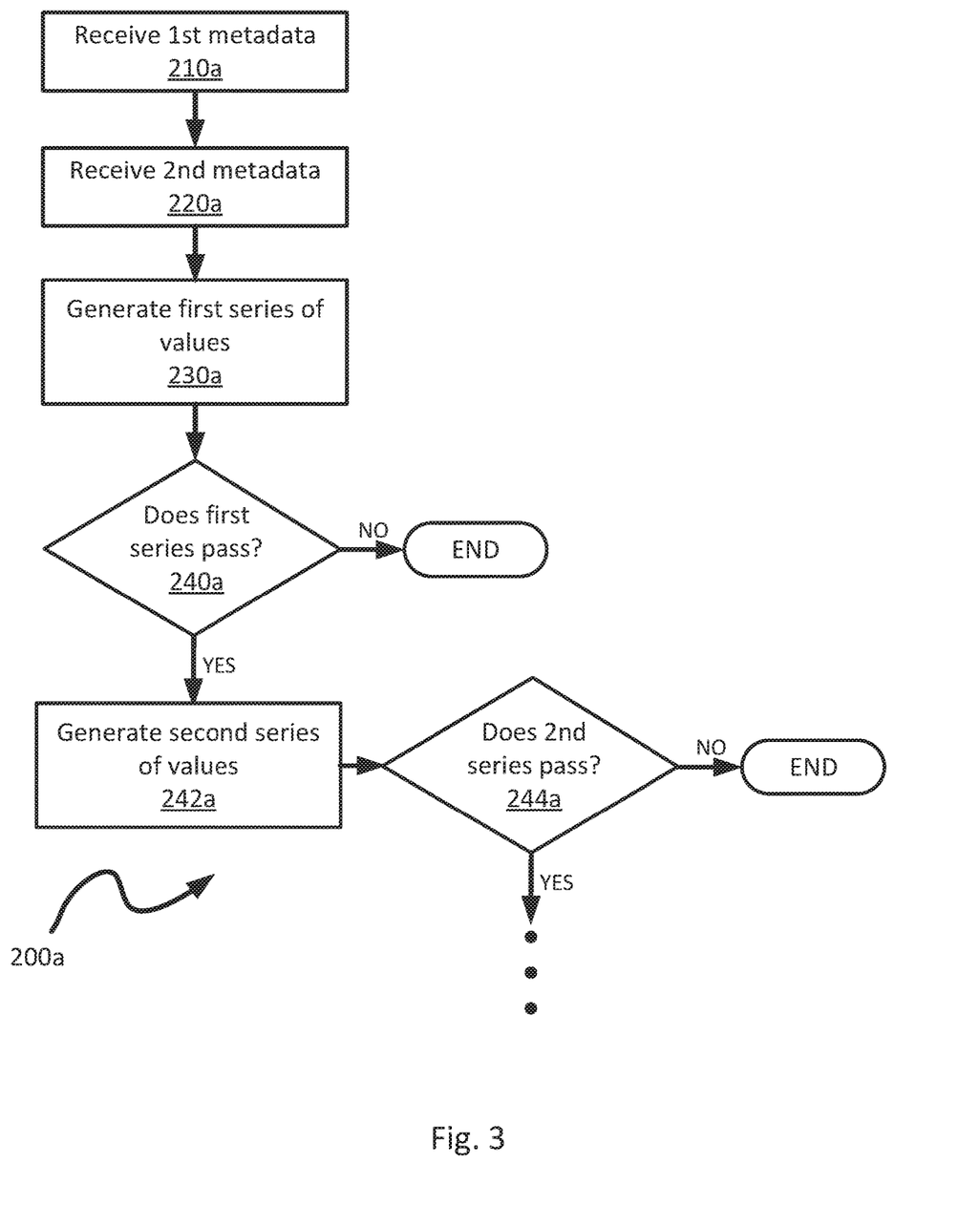
FIG. 3 is a flowchart of another example of a method of using metadata variance analytics to compare databases and orchestrate data from multiple data sources.

Referring to FIG. 3, a flowchart of another example method of using metadata variance analytics to compare databases and orchestrate data from multiple data sources is generally shown at 200a. Like blocks of the method 200a bear like reference to their counterparts in the method 200, except followed by the suffix "a". In order to assist in the explanation of method 200a, it will be assumed that method 200a may be performed with the apparatus 10. Indeed, the method 200a may be another way in which apparatus 10 may be configured. Furthermore, the following discussion of method 200a may lead to a further understanding of the apparatus 10 and the various ways in which it may be configured.

In the present example, block 210a and block 220a are similar to block 210 and block 220 as discussed above in connection with the method 200. In particular, block 210a and block 220a each receives metadata associated with a dataset from a source, such as a database maintained on a remote server, over the network 100 via the network interface 15.

In block 230a, a first series of variance values is generated based on the metadata received at block 210a and block 220a. The manner by which the first series of variance values is generated is not limited. In the present example, a portion of the metadata received from block 210a is joined with the metadata received at block 220a by the processor 20 to provide combined metadata. For example, the first series of variance values may include a variance values based on a count of the number of tables belonging to a certain type from the metadata received at block 210a and block 220a. It is to be appreciated that in examples where the metadata includes a single table type, the first series of variance values may be a single variance value based on the total table count of the metadata from the data sources.

Block 240a comprises using the analysis engine 30 to analyze the first series of variance values to confirm whether the different data sources may be considered to have passed a compatibility test. The manner by which the analysis engine 30 determines whether the first series of variance values pass is not limited. For example, the analysis engine 30 may be determining whether each variance value of the first series of variance values generated at block 230a is below a predetermined threshold. In particular, the analysis engine 30 may analyze the series of variance values to ensure that no variance value is above five percent. In other examples, the analysis engine 30 may analyze the variance analytics to ensure that no variance value is above ten percent. In yet another example, the analysis engine 30 may analyze the variance analytics to ensure that no variance value is above twenty-five percent. In some examples, the analysis engine may use multiple thresholds for each variance value in the variance analytics generated at block 230a.

In the event that the first series of variance values fails the compatibility test, the method 200a may end and an error message may be generated. This may allow a user or administrator to evaluate the first series of variance values and/or the metadata to determine whether an exception is to be granted and the data sources may be considered to be compatible. Alternatively, if the data sources from which the metadata originates are not compatible, one of the data sources may be corrected prior to migrating data between the data sources and/or merging data from the data sources.

In the event that the first series of variance values passes, the method 200a proceeds to block 242a. In block 242a, a second series of variance values is generated based on the metadata received at block 210a and block 220a. The manner by which the second series of variance values is generated is not limited and may involve similar methods as those for generating the first series of variance values. For the second series of variance values, another portion of the metadata received from block 210a is joined with a corresponding portion of metadata received at block 220a by the processor 20 to provide a second group of combined metadata. For example, the second series of variance values may include variance values based on a column count of each table in the metadata received at block 210a and block 220a.

Block 244a comprises using the analysis engine 30 to analyze the second series of variance values to confirm whether the different data sources may be considered to have passed the compatibility test. The manner by which the analysis engine 30 determines whether the second series of variance values pass is not limited. For example, the analysis engine 30 may be determining whether each variance value of the second series of variance values generated at block 242a is below a predetermined threshold. In particular, the analysis engine 30 may analyze the series of variance values to ensure that no variance value is above five percent. In other examples, the analysis engine 30 may analyze the variance analytics to ensure that no variance value is above ten percent. In yet another example, the analysis engine 30 may analyze the variance analytics to ensure that no variance value is above twenty-five percent. In some examples, the analysis engine may use multiple thresholds for each variance value in the variance analytics generated at block 242a.

In the event that the second series of variance values fails the compatibility test, the method 200a may end and an error message may be generated. This may allow a user or administrator to evaluate the second series of variance values and/or the metadata to determine whether an exception is to be granted and the data sources may be considered to be compatible. Alternatively, if the data sources from which the metadata originates are not compatible, one of the data sources may be corrected prior to migrating data between the data sources and/or merging data from the data sources.

It is to be appreciated that the method 200a may cycle and generate additional series of variance value compatibility tests to validate the metadata. In additional tests, the series of variance values may be binary to indicate whether there is a match or not. In such cases, a variance value of one or zero may be assigned to the series. For example, such series may include a binary result for names of schemas, tables or view, columnar data types, columnar nullable field strings, and columnar sequence. Furthermore, each additional series of variance values may be used to evaluate finer details in the metadata. Accordingly, using this method, incompatible metadata may be quickly identified using coarser compatibility tests. With each additional compatibility test using a finer series of variance data, the degree of validation of two data sources may be adjusted to be tailored to specific applications.

Figure 4:
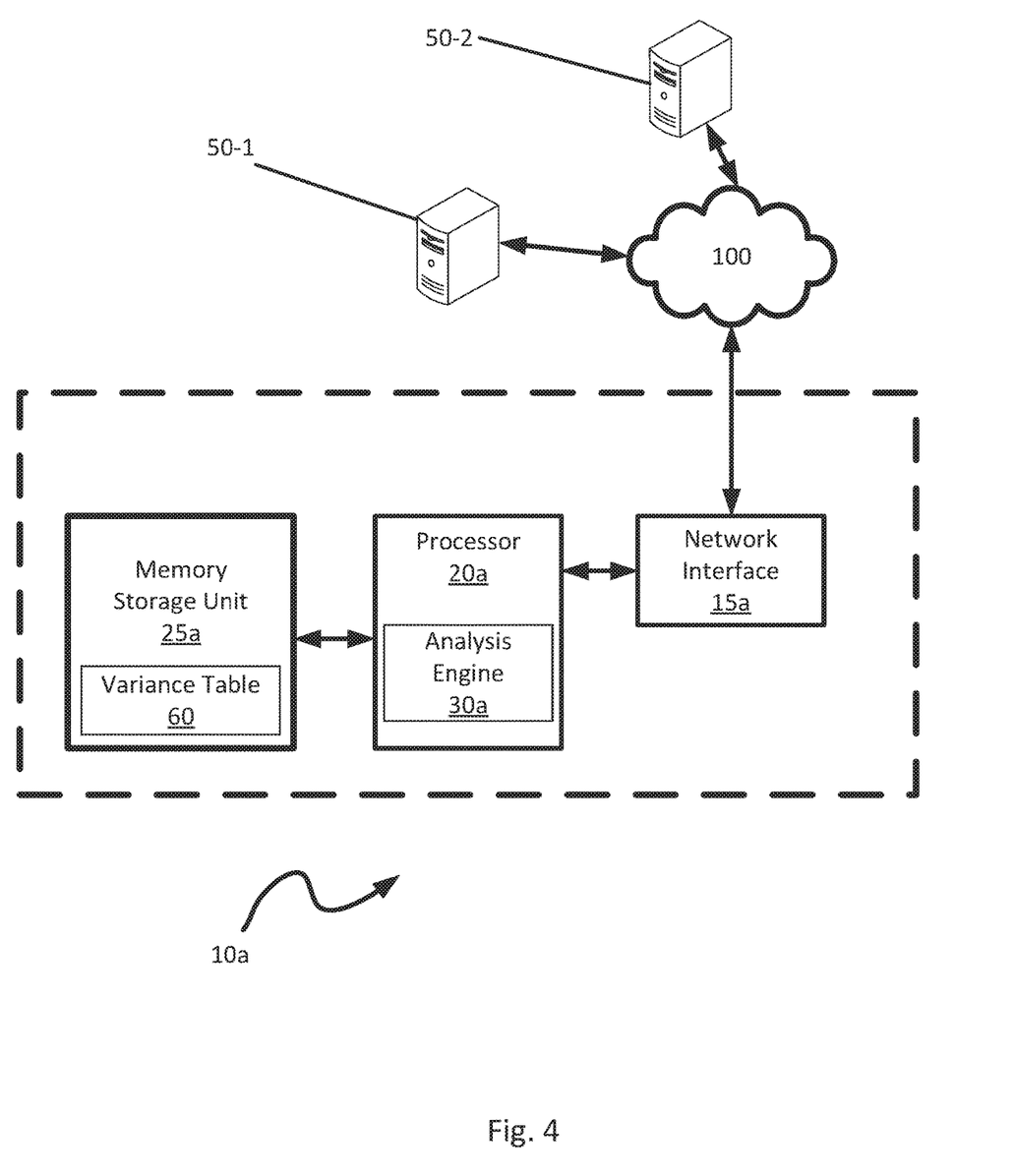
FIG. 4 is a block diagram of an example system to use metadata variance analytics to compare databases and orchestrate data from multiple data sources.

Referring to FIG. 4, another example of an apparatus to use metadata variance analytics to compare databases and orchestrate data from multiple data sources is shown at 10a. Like components of the apparatus 10a bear like reference to their counterparts in the apparatus 10, except followed by the suffix "a". The apparatus 10a includes a network interface 15a, a processor 20a, a memory storage unit 25a, and an analysis engine 30a operated by the processor 20a.

In the present example, the apparatus 10a is to operate as part of a device as a service system. In particular, the device as a service system may be an Internet of Things solution, where devices, users, and companies are treated as components in a system that facilitates analytics-driven point of care. In particular, the apparatus 10a may be in communication with other servers 50-1 and 50-2 (generically, these devices are referred to herein as "server 50" and collectively they are referred to as "servers 50", this nomenclature is used elsewhere in this description). Each of the servers 50 may maintain a database and may be a data source for metadata. Accordingly, the apparatus 10a may be used to orchestrate data between the servers 50.

In the present example, the memory storage unit 25a is also to store a variance table 60. The variance table 60 is to store variance values generated by the processor 20a. It is to be appreciated that by generating multiple series of variance data at a central location, such as the memory storage unit 25a, fast retrieval and analysis by the analysis engine 30a may be carried out.

Figure 5A:
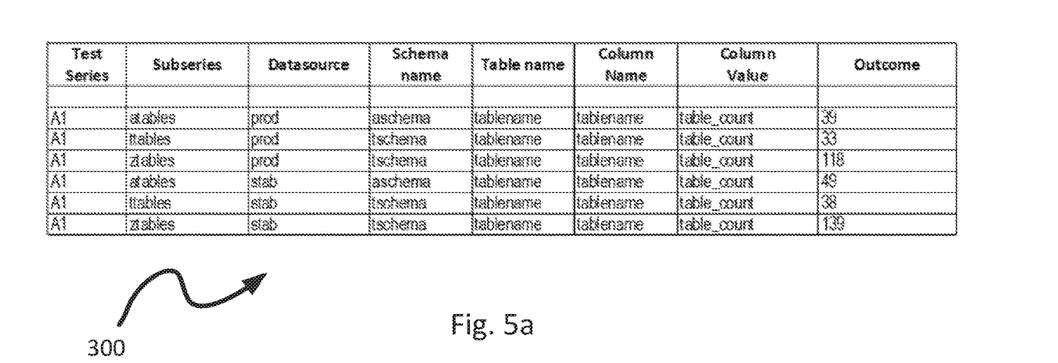
FIGS. 5A-B are examples of a metadata tables generated from the datasets from two data sources showing (a) table counts; and (b) column counts.

Referring to FIG. 5a, an example of a portion of metadata from two data sources "prod" and "stab" is shown generally at 300. In table 300, the metadata may represent a portion from which a first series of variance data is to be calculated. In particular, each data source has three types of data tables (subseries—"atables", "ttables", and "ztables"). For each subseries, a count of the number of tables in the metadata is also provided.

Figure 5B:
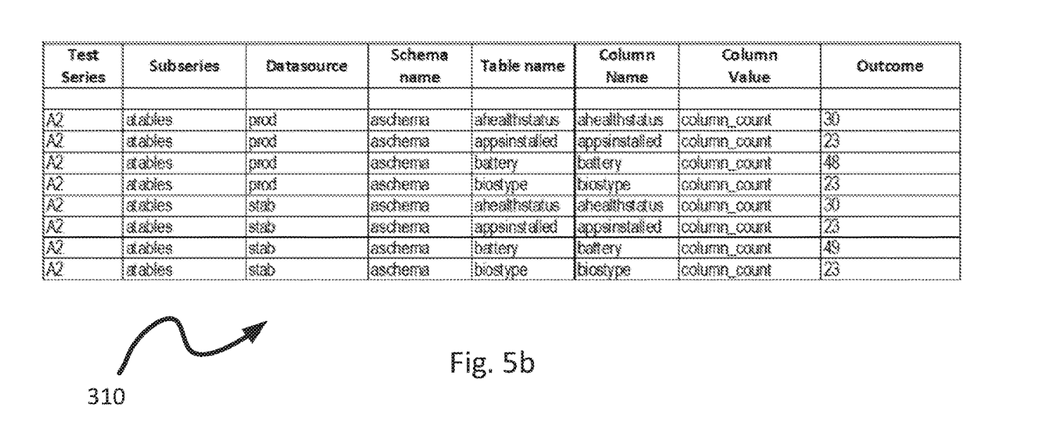

Referring to FIG. 5b, an example of another portion of metadata from two data sources "prod" and "stab" is shown generally at 310. In table 310, the metadata may represent a portion from which a second series of variance data is to be calculated. In particular, for the subseries "atables", each data source has four tables ("ahealthstatus", "appsinstalled", "battery", and "biostype"). For each subseries, a count of the number of columns in each table is also provided.

Figure 6A:
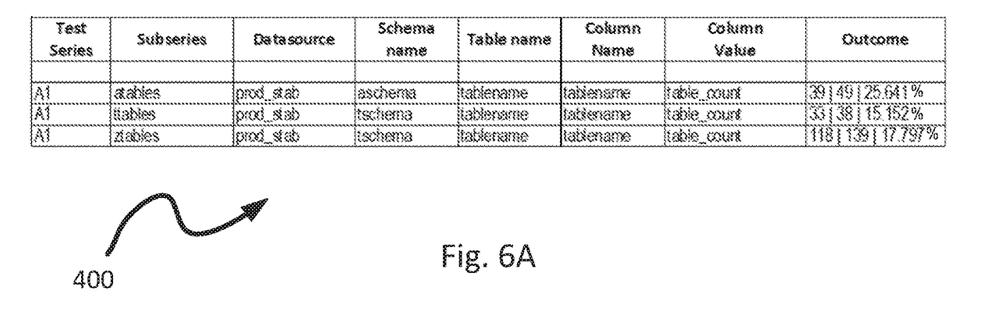
FIGS. 6A-B are examples of a joined metadata tables showing the percentage variance calculated from (a) table counts; and (b) column counts.

Referring to FIG. 6a, a portion of the contents of the variance table 60 derived from the values in table 300 are calculated and generally shown in the table 400. It is to be appreciated that the generation of the data shown in the table 400 may be the result from the execution of block 230a. In this example, table 400 illustrates the variance between the data source "prod" and the data source "stab". In particular, the data in table 400 show that the number of "atables", "ttables", and "ztables" are different between two data sources by 25.641%, 15.152%, and 17.797%. Accordingly, this provides an administrator or designer with a way to quantify the differences. For example, if a 20% difference in table numbers between data sources is considered an acceptable tolerance in a data migration, this series may fail a compatibility test based on this series of variance values.

Figure 6B:
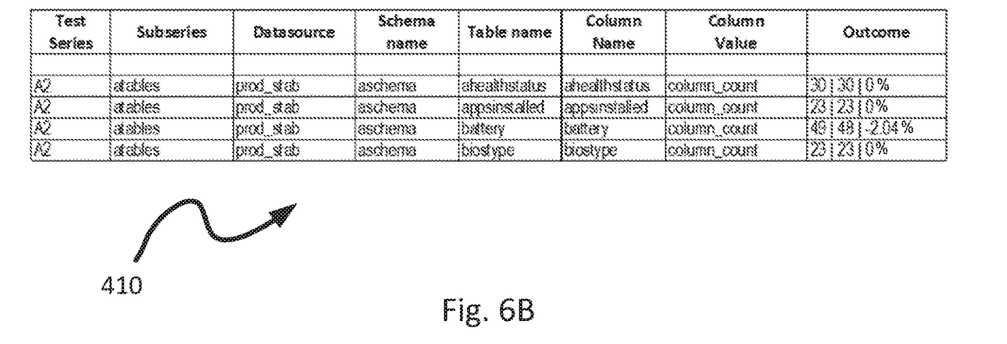

Referring to FIG. 6a, another portion of the contents of the variance table 60 derived from the values in table 310 are calculated and generally shown in the table 410. It is to be appreciated that the generation of the data shown in the table 410 may be the result from the execution of block 242a. In this example, table 410 illustrates the variance between the data source "prod" and the data source "stab". In particular, the data in table 400 show that the column count for "ahealthstatus", "appsinstalled", "battery", and "biostype" are different between two data sources by 0%, 0%, −2.04%, and 0%, respectively. Accordingly, this provides an administrator or designer with a way to quantify the differences. For example, if a 5% difference in column counts between data sources is considered an acceptable tolerance in a data migration, this series may pass a compatibility test based on this series of variance values.

It is to be recognized that features and aspects of the various examples provided above may be combined into further examples that also fall within the scope of the present disclosure.

What is claimed is:

1. An apparatus comprising:
   a network interface to receive: first metadata associated with a first dataset at a first data source; and second metadata associated with a second dataset at a second data source;
   a processor to determine a first series and a second series of variance values associated with first metadata and second metadata, wherein the first series comprises a first numerical variance between counts of the respective plurality of tables from the first metadata and the second metadata, and the second series comprises a second numerical variance between counts of the respective plurality of columns from the first metadata and the second metadata;
   a memory storage unit to store the first series and the second series;
   an analysis engine to:
   in response to the first numerical variance results of the first series being below a first predetermined threshold variance and the second numerical variance results of the second series being below a second predetermined threshold variance: confirming that the first data source and the second data source are compatible; and
   in response to the first numerical variance results of the first series being above a first predetermined threshold variance: generating an error message; allowing an evaluation of one or more of the first series of variance values and the first metadata to determine whether an exception is to be granted; when the exception is granted, confirming that the first data source and the second data source are compatible, when the exception is not granted, not confirming that the first data source and the second data source are compatible; and
   an orchestration engine to combine the first dataset from the first data source with the second dataset from the second data source to generate a combined dataset when compatibility between the first data source and the second data source is confirmed.

2. The apparatus of claim 1, wherein the processor calculates a variance value by a joining process of the first metadata with the second metadata.

3. The apparatus of claim 1, wherein first predetermined threshold variance is five percent.

4. The apparatus of claim 1, wherein the analysis engine is further to quantify a difference between the first data source and the second data source.

5. A method comprising:
   receiving via a network interface: first metadata associated with a first data source, the first metadata indicating first quantities of first database elements for the first data source; and second metadata associated with a second data source, the second metadata indicating second quantities of second database elements for the second data source;

generating a first numerical variance between counts of the respective plurality of tables of the first quantities and the second quantities;

in response to the first numerical variance being below a first predetermined threshold variance: generating a second numerical variance between counts of the respective plurality of columns of the first quantities and the second quantities;

in response to the second numerical variance being below a second predetermined threshold variance, confirming that the first data source and the second data source are compatible; and, in response to the confirming:

combining a first dataset from the first data source with a second dataset from the second data source to generate a combined dataset; and in response to the first numerical variance being above the first predetermined threshold variance, one of:

generating an error message; allowing an evaluation of one or more of the first numerical variance and the first metadata to determine whether an exception is be granted; when the exception is granted, confirming that the first data source and the second data source are compatible and combining the first dataset and the second dataset; and when the exception is not granted, not confirming that the first data source and the second data source are compatible and not combining the first dataset and the second dataset; or, correcting one of the first data source and the second data source prior to combining the first dataset and the second dataset.

6. A non-transitory machine-readable storage medium encoded with instructions executable by a processor, the non-transitory machine-readable storage medium comprising:

instructions to receive: first metadata associated with a first data source; and second metadata is associated with a second data source, wherein the first metadata includes: a first table count of a plurality of first database tables; and a first column count of a plurality of columns of the first database tables of the first data source; and wherein the second metadata includes: a second table count of a plurality of second database tables and a second column count of a plurality of columns of the second database tables of the second data source;

instructions to determine a first series of variance values associated with the first metadata and the second metadata, and to determine a second series of variance values associated with the first metadata and the second metadata, wherein the first series comprises a first numerical variance between the first table count and the second table count, and wherein the second series comprises a second numerical variance between the first column count and the second column count;

instructions to confirm compatibility between the first data source and the second data source by:

determining that the first numerical variance results of the first series passes a first compatibility test when the first numerical variance is below a first predetermined threshold variance; and, in response:

determining that the second numerical variance results of the second series passes a second compatibility test when the second numerical variance is below a second predetermined threshold variance; and in response to the first compatibility test and the second compatibility test being passed, confirming that the first data source and the second data source are compatible;

instructions to combine a first dataset from the first data source with a second dataset from the second data source to generate a combined dataset when compatibility between the first data source and the second data source is confirmed; and instructions to, in response to determining that the first compatibility test is failed when the first numerical variance is above the first predetermined threshold variance, correcting one of the first data source and the second data source prior to combining the first dataset and the second dataset.

* * * * *